United States Patent
Webster et al.

(10) Patent No.: US 8,297,632 B2
(45) Date of Patent: Oct. 30, 2012

(54) STEERING KNUCKLE AND METHOD OF FORMING SAME

(75) Inventors: James A. Webster, Washington Township, MI (US); Tomasz Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 12/871,990

(22) Filed: Aug. 31, 2010

(65) Prior Publication Data

US 2012/0049477 A1   Mar. 1, 2012

(51) Int. Cl.
    *B62D 7/18* (2006.01)
(52) U.S. Cl. .................................................. 280/93.512
(58) Field of Classification Search ............. 280/124.11, 280/124.134, 93.512
    See application file for complete search history.

(56) References Cited

U.S. PATENT DOCUMENTS

| | | | |
|---|---|---|---|
| 3,128,365 A * | 4/1964 | Schilberg ................... 219/76.15 |
| 3,147,026 A * | 9/1964 | Schilberg ................. 280/124.136 |
| 4,509,774 A * | 4/1985 | Booher .................. 280/124.134 |
| 4,618,159 A * | 10/1986 | Kozyra et al. ............. 280/93.512 |
| 5,366,233 A * | 11/1994 | Kozyra et al. ............. 280/93.512 |
| 5,620,042 A * | 4/1997 | Ihm ................................ 164/95 |
| 6,030,570 A * | 2/2000 | McLaughlin ................. 264/279 |
| 6,099,003 A * | 8/2000 | Olszewski et al. ........ 280/93.512 |
| 6,431,255 B1 * | 8/2002 | Ghosh et al. ................... 164/361 |
| 6,513,818 B1 * | 2/2003 | Seuser et al. ............. 280/93.512 |
| 6,719,104 B1 * | 4/2004 | Wemple et al. ............... 188/73.1 |
| 6,811,169 B2 * | 11/2004 | Schroeder et al. ..... 280/124.171 |
| 6,860,498 B2 * | 3/2005 | McGaughy ................ 280/93.51 |
| 7,159,316 B2 * | 1/2007 | Sadanowicz et al. ..... 29/894.361 |
| 7,159,880 B2 * | 1/2007 | Budde et al. .......... 280/124.128 |
| 7,205,251 B2 * | 4/2007 | Wellman ........................ 442/225 |
| 7,354,052 B2 * | 4/2008 | Orimoto et al. ......... 280/124.135 |
| 7,381,445 B2 * | 6/2008 | Brun .......................... 427/163.2 |
| 7,934,732 B1 * | 5/2011 | Kinney et al. ............. 280/93.512 |
| 8,070,993 B2 * | 12/2011 | Keys ............................ 264/40.4 |
| 2004/0263099 A1 * | 12/2004 | Maslov et al. ................ 318/254 |
| 2005/0023052 A1 * | 2/2005 | Beck et al. ................. 180/24.07 |
| 2006/0024490 A1 * | 2/2006 | Werner et al. ................. 428/323 |
| 2006/0054423 A1 * | 3/2006 | Murata ........................ 188/18 A |
| 2011/0135948 A1 * | 6/2011 | Pyzik et al. ................... 428/454 |

FOREIGN PATENT DOCUMENTS

JP  58089409 A  *  5/1983
JP  58089410 A  *  5/1983

* cited by examiner

*Primary Examiner* — Joseph Rocca
*Assistant Examiner* — Laura Freedman
(74) *Attorney, Agent, or Firm* — Quinn Law Group, PLLC

(57) ABSTRACT

A steering knuckle for a vehicle includes a metal body having a first portion defining a bore therethrough and a second portion extending longitudinally from said first portion. The steering knuckle also includes a ceramic insert disposed with the first portion and the second portion and surrounding the bore. A method of forming the steering knuckle includes disposing the ceramic insert within a cavity of a mold, sufficiently filling the cavity with a molten metal to contact and envelop the ceramic insert with the molten metal, and solidifying the molten metal so as to surround the ceramic insert with the metal body to thereby form the steering knuckle.

16 Claims, 3 Drawing Sheets

STEERING KNUCKLE AND METHOD OF FORMING SAME

TECHNICAL FIELD

The present disclosure generally relates to a steering knuckle for a vehicle, and more specifically, to a steering knuckle including a ceramic insert.

BACKGROUND

Vehicle suspension and steering components allow vehicle wheels to pivot and translate vertically during vehicle operation. For example, a steering knuckle may transfer steering motion to and pivot the vehicle wheels during cornering, braking, and suspension events. As such, steering knuckles often absorb and/or transfer forces from the vehicle wheels.

SUMMARY

A steering knuckle for a vehicle includes a metal body having a first portion defining a bore therethrough, and a second portion extending longitudinally from the first portion. The steering knuckle also includes a ceramic insert disposed within the first portion and the second portion and surrounding the bore.

In one variation, the steering knuckle is configured for attachment to a vehicle component. In particular, the metal body is configured for attachment, and the ceramic insert includes a plurality of ceramic fibers interwoven with the metal body, wherein the ceramic insert has a first longitudinal segment and a second longitudinal segment. Each of the first longitudinal segment and the second longitudinal segment is disposed within each of the first portion and the second portion, whereby the ceramic insert surrounds the bore and reinforces the metal body.

A method of forming a steering knuckle includes disposing a ceramic insert within a cavity of a mold. After disposing, the method includes sufficiently filling the cavity with a molten metal to contact and envelop the ceramic insert with the molten metal. The method further includes solidifying the molten metal so as to surround the ceramic insert with a metal body having a first portion defining a bore therethrough, and a second portion extending longitudinally from the first portion to thereby form the steering knuckle. The ceramic insert is disposed within the first portion and the second portion and surrounds the bore.

The steering knuckle formed by the method exhibits an increased stiffness-to-weight ratio without a detrimental increase in weight. More specifically, the ceramic insert reduces the weight of the steering knuckle, and reinforces the metal body to provide the steering knuckle with excellent rigidity and strength. Therefore, the steering knuckle exhibits excellent stiffness and structural integrity without negatively impacting a weight of the vehicle. In addition, the steering knuckle provides excellent attachment interfaces for suspension components of the vehicle such as bearings and calipers, and the increased stiffness of the steering knuckle reduces deflection of such components. Further, the method allows for economical production of the steering knuckle.

The above features and advantages and other features and advantages of the present disclosure are readily apparent from the following detailed description of the best modes for carrying out the disclosure when taken in connection with the accompanying drawings.

DETAILED DESCRIPTION

Figure 1:
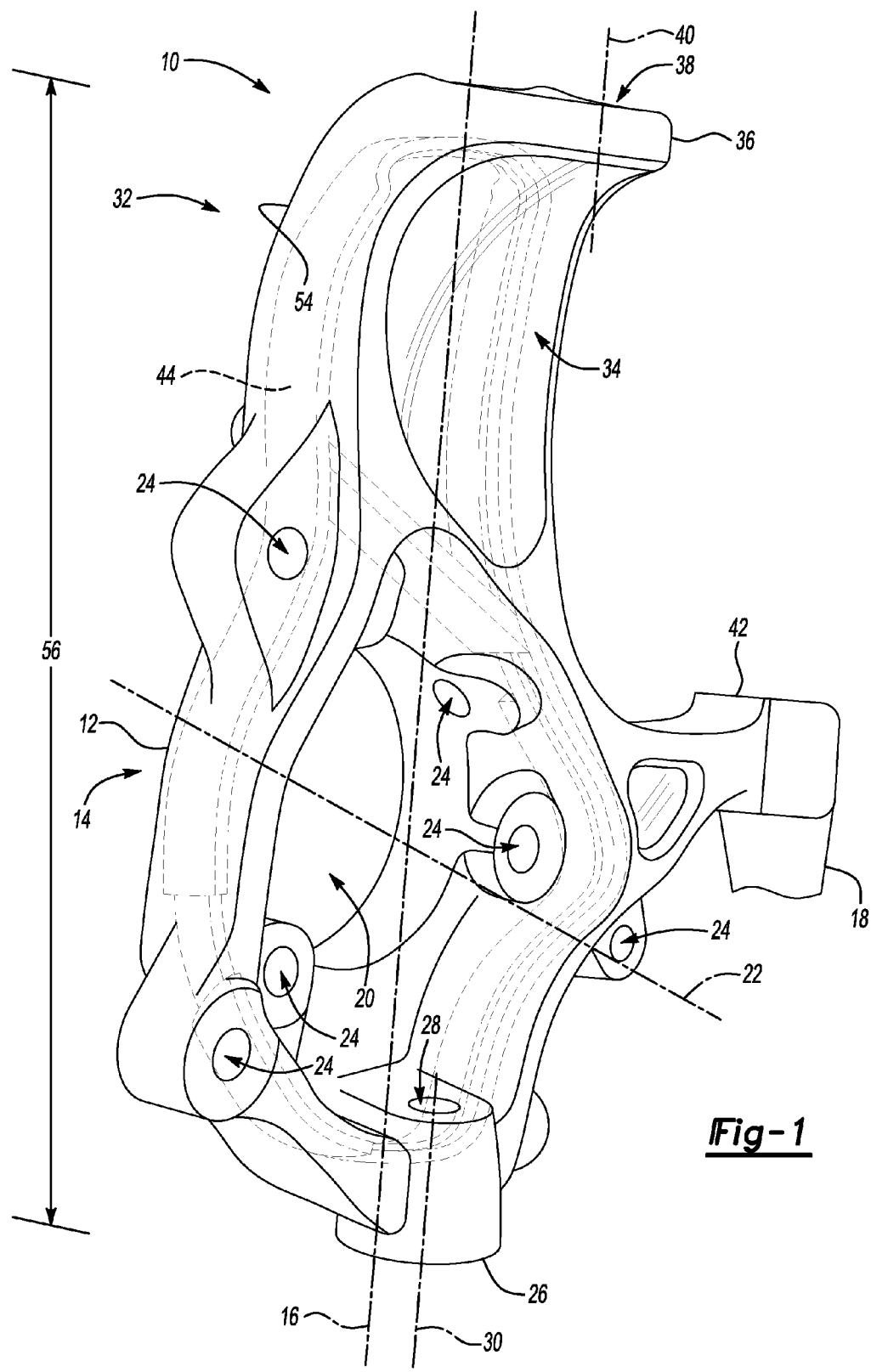
FIG. 1 is a schematic perspective view of a steering knuckle including a ceramic insert in phantom.

Referring to the Figures, wherein like reference numerals refer to like elements, a steering knuckle for a vehicle is shown generally at 10 in FIG. 1. The steering knuckle 10 may be useful for automotive applications requiring a pivotable vehicle wheel (not shown) for cornering, braking, and suspension events, e.g., travel over uneven surfaces. However, the steering knuckle 10 may also be useful for non-automotive applications, such as, but not limited to, aviation and construction applications.

Referring to FIG. 1, the steering knuckle 10 includes a metal body 12 having a first portion 14. The metal body 12 may have a generally elongated shape that extends along a longitudinal axis 16 of the steering knuckle 10, as shown in FIG. 1. In one variation, the steering knuckle 10, and more specifically, the metal body 12, is configured for attachment to a vehicle component 18, as set forth in more detail below. For example, the first portion 14 of the metal body 12 may be configured for attachment to vehicle components, such as, but not limited to, a tie rod (illustrated generally at 18 in FIG. 1), a brake (not shown) and/or the vehicle wheel (not shown). The first portion 14 of the steering knuckle 10 may be disposed adjacent and attached to the brake and/or vehicle wheel during operation of the vehicle.

Therefore, with continued reference to FIG. 1, the first portion 14 defines a bore 20 therethrough. The bore 20 may extend entirely through the first portion 14 of the metal body 12 so as to be substantially perpendicular to the longitudinal axis 16 of the steering knuckle 10, i.e., so that a central axis 22 of the bore 20 is substantially perpendicular to the longitudinal axis 16 of the steering knuckle 10. Further, the bore 20 may be configured, sized, and/or shaped to receive a hub (not shown) of the vehicle wheel. That is, the vehicle wheel may attach to the steering knuckle 10 via insertion of the wheel hub into the bore 20.

As further shown in FIG. 1, the first portion 14 of the steering knuckle 10 may also include a plurality of holes 24 configured for receiving a plurality of respective attachment elements (not shown), such as bolts and/or screws. During vehicle assembly and/or repair, the attachment elements may couple the steering knuckle 10 to the brake and/or vehicle wheel.

Further, the first portion 14 may define a second bore 28 therethrough that is substantially perpendicular to the aforementioned bore 20. For example, the second bore 28 may be defined by a proximal end 26 of the first portion 14. The second bore 28 may be configured, sized, and/or shaped to receive a vehicle steering and/or suspension system component (not shown), such as, but not limited to, an axle yoke, shock absorber, strut, tie rod, linkage, or ball joint. A center axis 30 of the second bore 28 may be substantially perpendicular to the central axis 22 of the bore 20, and substantially parallel to the longitudinal axis 16 of the steering knuckle 10.

Referring again to FIG. 1, the metal body 12 also includes a second portion 32 extending longitudinally from the first portion 14. That is, the second portion 32 extends away from the first portion 14 along the longitudinal axis 16 of the steering knuckle 10. The second portion 32 may be arcuate with respect to the first portion 14. That is, the second portion 32 may be adapted or molded to bow with respect to the longitudinal axis 16, e.g., away from the vehicle wheel. In addition, the second portion 32 may define one or more concavities or recessions 34 that are configured for reducing a mass of the steering knuckle 10.

As shown in FIG. 1, a distal end 36 of the second portion 32 may define a third bore 38 therethrough that is substantially perpendicular to the bore 20 of the first portion 14. The third bore 38 may be configured, sized, and/or shaped to receive a vehicle suspension and/or steering system component (not shown), such as, but not limited to, a shock absorber, strut, tie rod, linkage, or ball joint. A center axis 40 of the third bore 38 may be substantially perpendicular to the central axis 22 of the bore 20, and substantially parallel to the longitudinal axis 16 of the steering knuckle 10.

As shown in FIG. 1, the first portion 14 may be integral with the second portion 32 of the metal body 12. That is, the steering knuckle 10 may include one metal body 12 having the first portion 14 and the second portion 32, as set forth above. Further, the metal body 12 may be formed from any suitable metal selected according to the desired operating conditions of the steering knuckle 10. For example, for applications requiring excellent strength and reduced weight, the metal body 12 may include aluminum. For example, the metal body 12 may include SAE D4512 aluminum. The metal body 12 may alternatively or additionally include aluminum alloys, forged steel, cast iron, and/or combinations thereof.

The metal body 12 may also include one or more arms, shown generally at 42 in FIG. 1. The one or more arms 42 may also be integral with the first portion 14 and the second portion 32, and may be configured, sized, and/or shaped for attachment to a steering or vehicle component 18, e.g., a tie rod.

Figure 2:
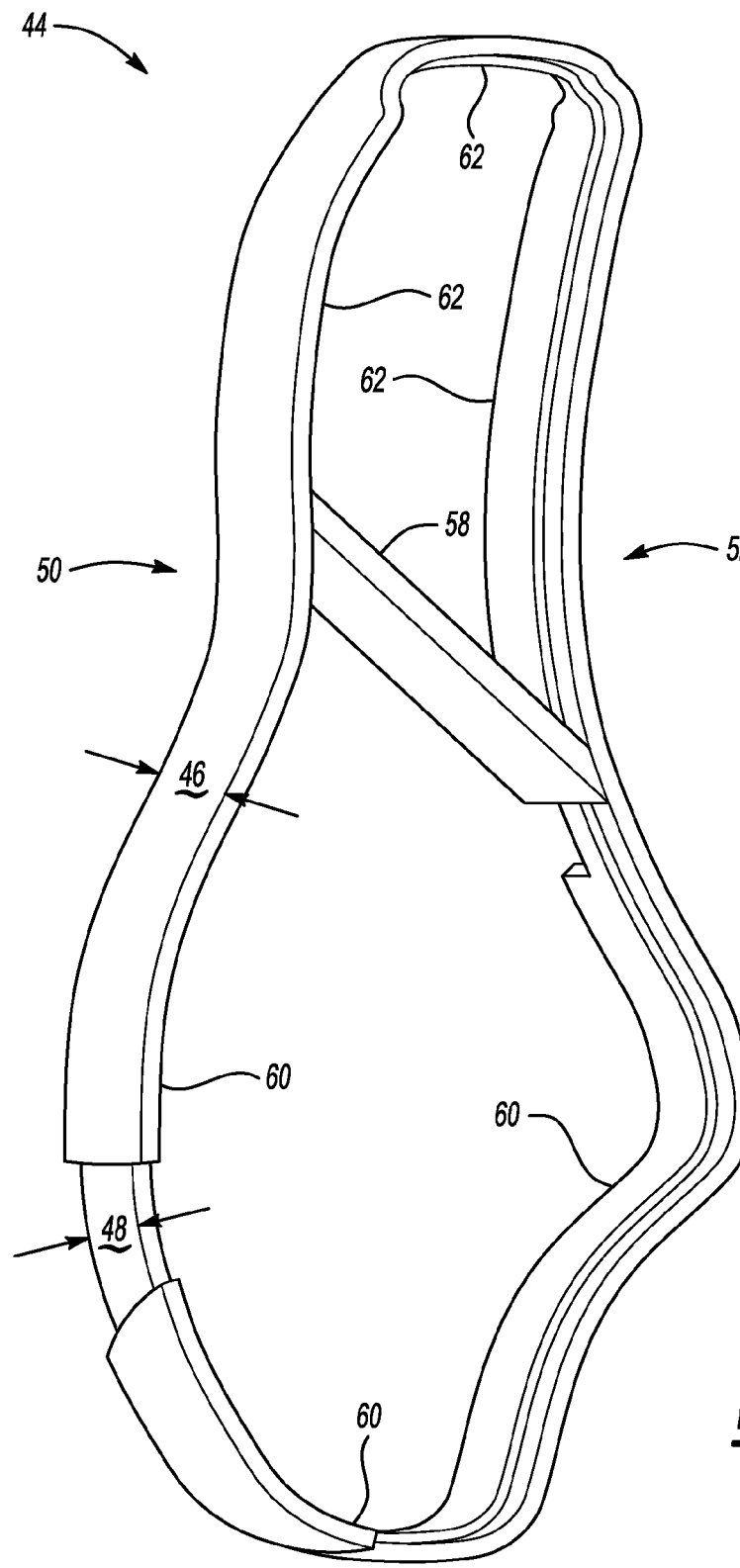
FIG. 2 is a schematic perspective view of the ceramic insert of FIG. 1.

Referring to FIGS. 1 and 2, the steering knuckle 10 further includes a ceramic insert 44 disposed within the first portion 14 and the second portion 32 and surrounding the bore 20. For example, as shown in FIG. 2, the ceramic insert 44 may be shaped or configured as a curvilinear band and configured for reinforcing the metal body 12. As used herein, the terminology "curvilinear" refers to a shape characterized by following a curved line composed of at least one arcuate section, i.e., a shape that is non-rectilinear. For example, the ceramic insert 44 may be continuously curvilinear or may have an arcuate portion. Therefore, the ceramic insert 44 may have a shape that is non-rectilinear and may be defined by smooth, flowing, curving lines.

Additionally, as shown in FIG. 2, the ceramic insert 44 may have at least a first thickness 46 and a second thickness 48 that is less than the first thickness 46. That is, the ceramic insert 44 may have relatively thicker and/or thinner regions so as to further reduce the weight of the steering knuckle 10 or to accommodate functional features of the metal body 12. In one variation, as shown in FIG. 2, the ceramic insert 44 may have the first thickness 46 in regions configured for reinforcing the metal body 12, and the ceramic insert 44 may have the second thickness 48 in regions configured for sharp curvatures and/or small tolerances between functional features of the metal body 12.

Referring again to FIG. 2, the ceramic insert 44 may include a first longitudinal segment 50 and a second longitudinal segment 52 integral with the first longitudinal segment 50. That is, the first longitudinal segment 50 and the second longitudinal segment 52 may each extend lengthwise along the longitudinal axis 16 (FIG. 1) of the steering knuckle 10. Although the first longitudinal segment 50 and the second longitudinal segment 52 are integral with one another, the first longitudinal segment 50 and the second longitudinal segment 52 may be asymmetrical with respect to one another. That is, the first longitudinal segment 50 and the second longitudinal segment 52 may have different shapes, lengths, and/or thicknesses 46, 48. For example, the second longitudinal segment 52 may bow towards the arm 42 (FIG. 1) and/or may correlate to a contour of an external surface 54 (FIG. 1) of the metal body 12. Alternatively, the first longitudinal segment 50 may have the same shape as the second longitudinal segment 52.

Referring to FIGS. 1 and 2, the first longitudinal segment 50 may be disposed within each of the first portion 14 and the second portion 32 of the metal body 12. That is, the first longitudinal segment 50 may extend along substantially an entire length 56 (FIG. 1) of the metal body 12. Likewise, the second longitudinal segment 52 may be disposed within each of the first portion 14 and the second portion 32 of the metal body 12 so as to similarly extend along substantially the entire length 56 of the metal body 12.

With continued reference to FIG. 2, the ceramic insert 44 may further include a crossbar 58 interconnecting each of the first longitudinal segment 50 and the second longitudinal segment 52. That is, the crossbar 58 may bridge and connect the first longitudinal segment 50 and the second longitudinal segment 52. More specifically, the crossbar 58 may be aligned within the metal body 12 so as to be disposed between the proximal end 26 (FIG. 1) of the first portion 14 and the distal end 36 (FIG. 1) of the second portion 32. For example, as shown in FIG. 2, the crossbar 58 may divide the ceramic insert 44 so as to define a first belt 60 and a second belt 62. Each of the first belt 60 and the second belt 62 may be configured for reinforcing the metal body 12, as set forth in more detail below. The crossbar 58 may be integral with each of the first longitudinal segment 50 and the second longitudinal segment 52 so that each of the first belt 60 and the second belt 62 is continuous.

As shown in FIGS. 1 and 2, the first belt 60 may be disposed within the first portion 14 of the metal body 12 and the second belt 62 may be disposed within the second portion 32 of the metal body 12. That is, the first belt 60 may circumscribe the bore 20 and the second belt 62 may extend away from the first belt 60 into the second portion 32 along the longitudinal axis 16 of the steering knuckle 10. Therefore, the first belt 60 may be configured, sized, and/or shaped to reinforce the first portion 14 of the metal body 12, as the second belt 62 may be configured, sized, and/or shaped to reinforce the second portion 32 of the metal body 12. As such, the ceramic insert 44 may be disposed entirely within the metal body 12 so as to reinforce the metal body 12, and the ceramic insert 44 may be surrounded and enveloped by the metal body 12.

Figure 3:
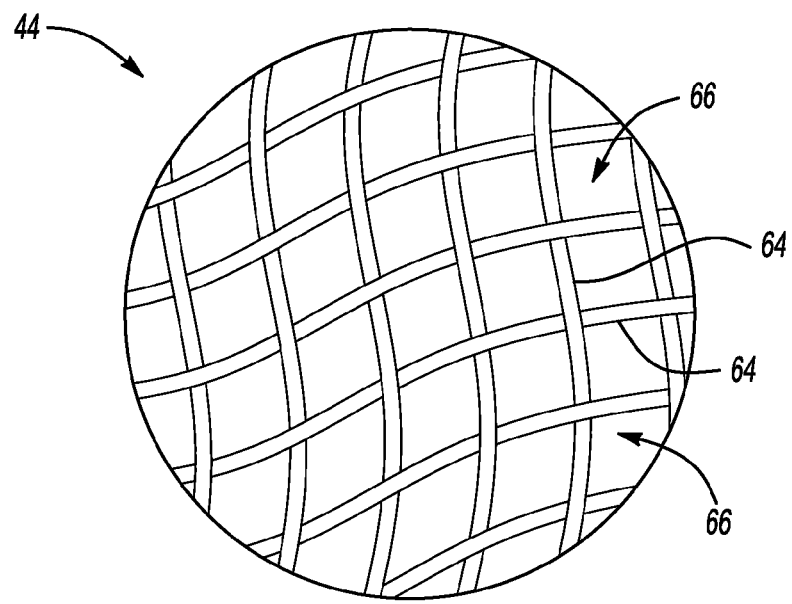
FIG. 3 is a magnified schematic view of a portion of the ceramic insert of FIGS. 1 and 2.

Referring now to FIG. 3, the ceramic insert 44 may include a plurality of ceramic fibers 64 interwoven with one another to define a plurality of interstices 66. Suitable ceramic fibers 64 may include carbon, silicon, boron, nitrogen, zirconium, titanium, magnesium, and combinations thereof. For example, the ceramic fibers 64 may be glass-reinforced carbon fibers or structural ceramic fibers. The ceramic fibers 64 may have an average length of from about 5 mm to about 10 mm, and the ceramic fibers 64 may be present in the steering knuckle 10 in a ratio of from about 1 part ceramic fiber:5 parts aluminum to about 1 part ceramic fiber:6 parts aluminum. At amounts below the aforementioned ratio, the steering knuckle 10 may not exhibit desired stiffness and/or strength. At amounts above the aforementioned ratio, the metal body 12 may contribute to an increased weight of the steering knuckle 10.

As shown in FIG. 3 and described with reference to FIG. 1, the ceramic fibers 64 may be tightly-woven to provide desired structure, strength, and reinforcement capability to the ceramic insert 44. For example, the interstices 66 defined by the interwoven ceramic fibers 64 may have an average diameter of from about 0.1 mm to about 1 mm, e.g., about 0.5 mm, so as to allow penetration of the metal body 12 (FIG. 1) into the interstices 66. For example, aluminum may fill the plurality of interstices 66 so as to interconnect the metal body 12 and the ceramic insert 44. That is, aluminum may fill the interstices 66 so as to interlock the ceramic insert 44 within the metal body 12.

Such coupling between the ceramic insert 44 and the metal body 12 provides the steering knuckle 10 with an excellent stiffness-to-weight ratio. That is, the ceramic insert 44 is lightweight as compared to the metal body 12, and occupies a portion of the metal body 12 that would otherwise be filled with aluminum. Stated differently, the ceramic insert 44 may replace a portion of the mass of metal of the metal body 12. Further, the ceramic insert 44 stiffens the metal body 12 to provide the steering knuckle 10 with adequate rigidity for vehicle cornering, braking, and suspension events. In addition, since the steering knuckle 10 has excellent stiffness, the steering knuckle 10 reduces deflection of suspension components such as bearings and calipers (not shown), and provides excellent bearing and caliper attachment interfaces. For example, bearings and calipers attached to the steering knuckle 10 at the second bore 28 (FIG. 1) and/or the third bore 38 (FIG. 1) experience reduced wear and increased longevity during vehicle operation.

Figure 4:
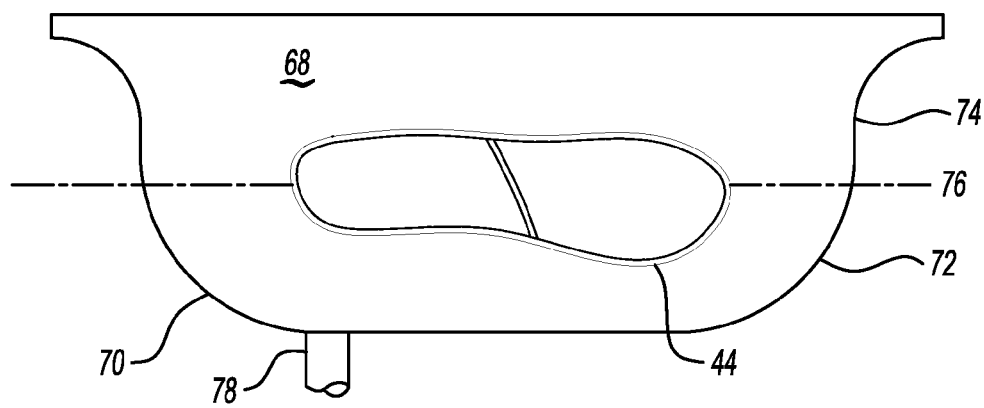
FIG. 4 is a schematic perspective view of the ceramic insert of FIG. 2 disposed within a cavity of a mold for forming the steering knuckle of FIG. 1.

A method of forming the steering knuckle 10 is also described with reference to FIGS. 1-4. Referring specifically to FIG. 4, the method includes disposing the ceramic insert 44 within a cavity 68 of a mold 70. The mold 70 may be suitable for casting the metal body 12 (FIG. 1), such as, but not limited to, a vacuum mold or a pressure mold. Generally, the mold 70 may include a first half 72 matable and separatable from a second half 74, for instance at 76, and define the cavity 68 configured to form to the contours of the metal body 12 when filled with metal.

After disposing the ceramic insert 44 within the mold 70, the method includes sufficiently filling the cavity 68 with a molten metal to contact and envelop the ceramic insert 44 with the molten metal. The molten metal may be any metal suitable for forming the metal body 12, such as, but not limited to, aluminum, steel, iron, and combinations thereof. The molten metal may be flowable, i.e., the molten metal may be in a liquid state during filling.

With continued reference to FIG. 4, the cavity 68 may be filled via any suitable device 78 configured to introduce, connect, pour, and/or draw the molten metal into the cavity 68. For example, filling may include drawing the molten metal into the cavity 68 under vacuum. More specifically, the molten metal may be drawn into the cavity 68 of the mold 70 via a vacuum riserless casting (VRC) process. For example, the mold 70 may be positioned over a sealed furnace (not shown) containing the molten metal to thereby connect the cavity 68 of the mold 70 to the molten metal by one or more riser tubes (not shown). The molten metal may be drawn into the cavity 68 by vacuum to remove air from the cavity 68 and fill the cavity 68 of the mold 70 with the molten metal. That is, the mold 70 may be "bottom-filled", i.e., filled so that the molten metal rises within the cavity 68 of the mold 70. As the molten metal is drawn into the cavity 68, the molten metal contacts and envelops the ceramic insert 44 (FIGS. 2 and 4). That is, the molten metal may surround the ceramic insert 44 and fill the interstices 66 (FIG. 3) of the ceramic insert 44, as set forth above.

In another variation, filling may include introducing the molten metal into the cavity 68 under pressure. For example, the molten metal may be introduced into the cavity 68 via a pressure riserless casting (PRC) process. More specifically, the mold 70 may be positioned over a sealed furnace (not shown) containing the molten metal to thereby connect the cavity 68 of the mold 70 to the molten metal by one or more riser tubes (not shown). The molten metal may be introduced into the cavity 68 under pressure and fill the cavity 68 of the mold 70 with the molten metal. That is, the mold 70 may be "bottom-filled", as set forth above. As the molten metal is introduced into the cavity 68, the molten metal contacts and envelops the ceramic insert 44 (FIGS. 2 and 4). That is, the molten metal surrounds the ceramic insert 44 and fills the interstices 66 (FIG. 3) of the ceramic insert 44, as set forth above. Pressure may be maintained on the mold 70 after the cavity 68 of the mold 70 is filled to ensure that the molten metal completely fills the cavity 68 and the interstices 66 of the ceramic insert 44.

In another variation, filling may include pouring the molten metal into the cavity 68. For example, the molten metal may be poured into the cavity 68 via a tilt-and-pour process. More specifically, a pour basin (not shown) may be positioned adjacent the mold 70 and filled in a horizontal position. As the pour basin and mold 70 tilt, the molten metal may be poured into the cavity 68 of the mold 70 so that the molten metal may surround the ceramic insert 44 (FIGS. 2 and 4) and fill the interstices 66 (FIG. 3) of the ceramic insert 44. Tilting the mold 70 generally minimizes turbulence of the molten metal during filling of the cavity 68 of the mold 70.

Referring now to FIGS. 1 and 4, the method further includes solidifying the molten metal so as to surround the ceramic insert 44 with the metal body 12 to thereby form the steering knuckle 10. As set forth above and shown in FIG. 1, the metal body 12 has the first portion 14 defining the bore 20 therethrough and the second portion 32 extending longitudinally from the first portion 14. The ceramic insert 44 is disposed within the first portion 14 and the second portion 32 and surrounds the bore 20, as also set forth above.

In one example, the molten metal may be solidified by quenching. That is, an ambient temperature of the molten metal and/or mold 70 may be reduced to thereby solidify the molten metal and form the steering knuckle 10 within the cavity 68 of the mold 70. After the metal body 12 including the ceramic insert 44 is formed, the steering knuckle 10 may be removed from the cavity 68 of the mold 70.

The resulting steering knuckle 10 formed by the method exhibits an increased stiffness-to-weight ratio without a detrimental increase in weight. More specifically, the ceramic insert 44 reduces the weight of the steering knuckle 10, and reinforces the metal body 12 to provide the steering knuckle 10 with excellent rigidity and strength. Therefore, the steering knuckle 10 exhibits excellent stiffness and structural integrity without negatively impacting a weight of the vehicle. In addition, the steering knuckle 10 provides excellent attachment interfaces for suspension components of the vehicle such as bearings and calipers, and the increased stiffness of the steering knuckle 10 reduces deflection of such components. Further, the method allows for economical production of the steering knuckle 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A steering knuckle for a vehicle, the steering knuckle comprising:
    a metal body having a first portion defining a bore therethrough and a second portion extending longitudinally from said first portion; and
    a ceramic insert disposed within said first portion and said second portion and surrounding said bore;
    wherein said ceramic insert is shaped as a curvilinear band and configured for reinforcing said metal body;
    wherein said ceramic insert has at least a first thickness and a second thickness that is less than the first thickness.

2. The steering knuckle of claim 1, wherein said ceramic insert includes a first longitudinal segment and a second longitudinal segment integral with said first longitudinal segment.

3. The steering knuckle of claim 2, wherein said first longitudinal segment is disposed within each of said first portion and said second portion of said metal body.

4. The steering knuckle of claim 2, wherein said first longitudinal segment and said second longitudinal segment are asymmetrical with respect to one another.

5. The steering knuckle of claim 1, wherein said ceramic insert includes a plurality of ceramic fibers interwoven with one another to define a plurality of interstices.

6. A steering knuckle for a vehicle, the steering knuckle comprising:
    a metal body having a first portion defining a bore therethrough and a second portion extending longitudinally from said first portion; and
    a ceramic insert disposed within said first portion and said second portion and surrounding said bore;
    wherein said ceramic insert is shaped as a curvilinear band and configured for reinforcing said metal body;
    wherein said ceramic insert includes a first longitudinal segment and a second longitudinal segment integral with said first longitudinal segment;
    wherein said ceramic insert further includes a crossbar interconnecting each of said first longitudinal segment and said second longitudinal segment.

7. The steering knuckle of claim 6, wherein said crossbar is integral with each of said first longitudinal segment and said second longitudinal segment.

8. The steering knuckle of claim 6, wherein said crossbar divides said ceramic insert so as to define a first belt and a second belt.

9. The steering knuckle of claim 8, wherein said first belt is disposed within said first portion of said metal body and said second belt is disposed within said second portion of said metal body.

10. The steering knuckle of claim 6, wherein said first longitudinal segment is disposed within each of said first portion and said second portion of said metal body.

11. The steering knuckle of claim 6, wherein said ceramic insert includes a plurality of ceramic fibers interwoven with one another to define a plurality of interstices.

12. The steering knuckle of claim 6, wherein said ceramic insert has at least a first thickness and a second thickness that is less than the first thickness.

13. The steering knuckle of claim 6, wherein said ceramic insert is disposed entirely within said metal body.

14. A steering knuckle for a vehicle, the steering knuckle comprising:
    a metal body having a first portion defining a bore therethrough and a second portion extending longitudinally from said first portion, wherein said metal body includes aluminum; and
    a ceramic insert disposed within said first portion and said second portion and surrounding said bore;
    wherein said ceramic insert includes a plurality of ceramic fibers interwoven with one another to define a plurality of interstices;
    wherein said aluminum fills said plurality of interstices so as to interconnect said metal body and said ceramic insert.

15. The steering knuckle of claim 14, wherein said ceramic insert includes a first longitudinal segment and a second longitudinal segment integral with said first longitudinal segment.

16. The steering knuckle of claim 15, wherein said ceramic insert further includes a crossbar interconnecting each of said first longitudinal segment and said second longitudinal segment.

* * * * *